United States Patent

[11] 3,632,148

[72] Inventor Daniel C. Garber
 Overbrook Hills, Pa.
[21] Appl. No. 53,779
[22] Filed July 10, 1970
[45] Patented Jan. 4, 1972
[73] Assignee Sun Shipbuilding & Dry Dock Company
 Chester, Pa.

[54] WELDED JOINT AND METHOD OF FABRICATING SAME
 13 Claims, 4 Drawing Figs.
[52] U.S. Cl. .................................................. 287/189.36,
 29/445, 52/80, 52/648
[51] Int. Cl. ................................................. B63c 11/00,
 B65d 7/02, E04b 1/32
[50] Field of Search......................................... 287/189.36
 B, 202 R; 114/16 R; 29/445; 52/80, 741, 664, 648

[56] References Cited
 UNITED STATES PATENTS
2,926,800 3/1960 Lasen et al. ................... 287/189.36 B X 3,390,492 7/1968 Myskowski ..................... 52/80
3,450,082 6/1969 Demarest, Jr. ................. 114/16 R
 FOREIGN PATENTS
496,739 1939 Great Britain ................ 287/189.36 B Primary Examiner—Alfred C. Perham
Attorneys—George L. Church, Donald R. Johnson, Wilmer E. McCorquodale, Jr. and Frank A. Rechif ABSTRACT: A lattice-type framework which is designed to withstand large compressive forces is fabricated from spokelike members or struts which are welded together at their ends. Each welded joint involves three members each having intersecting surfaces forming a "V" at the end to be joined, the members being assembled into a wye configuration and then welded together along the three pairs of mated surfaces. A tapered bore centered at the common point of intersection of all of the surfaces is drilled through the joint, and a tapered element (made from the same metal as the members, e.g., titanium is lapped and driven into this bore.

PATENTED JAN 4 1972

INVENTOR:
DANIEL C. GARBER
BY G.A. Rechif
ATTY.

WELDED JOINT AND METHOD OF FABRICATING SAME

This invention relates to a welded joint adapted to withstand vary large compressive forces, and to a method of fabricating the same.

The welded joint of this application has particular utility in a module or housing of the tube described in U.S. Pat. No. 3,390,492, dated July 2, 1968. Such a housing is designed for very deep submergence, such as to depths of 15,000 feet or more. At such depths, the housing is subjected to very large compressive forces. By way of example, at 15,000 feet in sea water the pressure on the outside of the housing is in excess of 6,600 pounds per square inch.

The module described in the above-identified patent is a composite devitrified (nucleated) glass-titanium alloy structure comprising an enclosed generally spherical chamber, capable of withstanding great external compressive force. A plurality of segments of devitrified glass from the primary load-bearing elements of the chamber, these segments being bounded by extremely flat edge surfaces which lie in radial planes of the sphere. The devitrified glass is that commercially available from the Corning Glass Works, Corning, N.Y. under the trademark Pyroceram, this glass having a compressive strength of 300,000 pounds per square inch. The segments are supported by a titanium-based alloy framework of lattice-type having extremely flat surfaces coextensively adjoining all of the edge surfaces of the devitrified glass segments. The framework preferably comprises an alloy of 6 percent aluminum, 4 percent vanadium, and balance titanium. The framework has a composite generally spherical configuration 12 feet in diameter, by way of example, which provides 12 generally pentagonal open areas or cavities, these open areas or cavities being closed in or covered each by a respective one of the glass segments or inserts previously mentioned; the glass segments are of pentagonal outer configuration.

The lattice framework described contemplates a welded construction, wherein the spokelike members or struts (which are curved to conform to the spherical outline) are welded together to provide the composite or overall spherical configuration desired. The welding of titanium and its alloys presents something of a problem, which is that with these materials air must be completely excluded from both the front and back areas of fusion welds, because oxygen, nitrogen, and water vapor can cause severe embrittlement of the welds. Electron-beam welding is readily employed on titanium and its alloys and offers a number of advantages, the principal one of which is that no contamination occurs because of the high vacuum required and utilized. However, the present state of development of electron-beam welding equipment is such that welds in titanium having a depth in excess of two inches cannot be reliably produced with such equipment, whereas the "unfinished" or "fabricated" width of the spokes or struts (elements of the lattice) is 3 inches, this being the smaller cross-sectional dimension of these struts. Hence, it would be impossible (using this technique) to butt-weld two struts or spokes together, at a point along the length of the sides of the pentagon, using a single welding pass.

An object of this invention is to provide a novel welded joint for a metallic structure.

Another object is to provide a welded joint whereby extra wide members may be welded together using the electron-beam technique.

An additional object is to provide a butt-welded joint for the corner or vertex of a polygon which, when the polygon is subjected to a compressional force, will virtually eliminate a stress concentration at such corner.

Still another object is to provide a joint structure for the spoke members or struts of a lattice-type framework.

Yet another object is to provide a novel method for joining together three spokelike members into a wye configuration.

A further object is to provide a novel method for welding together in abutting relationship three titanium members.

A still further object is to provide a joint structure for a framework which is adapted to withstand very large compressive forces.

A further, additional object is to provide a novel method for fabricating the supporting framework for the shell of a deep submergence module.

The objects of this invention are accomplished, briefly, in the following manner: One end of each of three titanium spokelike members or struts which are to be joined together into a wye configuration is provided with a pair of intersecting beveled surfaces, thereby forming a "V" configuration at the end of each member. These members are assembled into a wye configuration with their beveled surfaces abutting to provide three pairs of mated surfaces, which are then welded together. A previously formed opening centered at the common point of intersection of all the beveled surfaces is then reamed and tapered, and a metallic element or pin having a matching taper is lapped and driven into this tapered opening or bore until it closely engages the wall of the bore.

A detailed description of the invention follows, taken in conjunction with the accompanying drawings, wherein.

Figure 1:
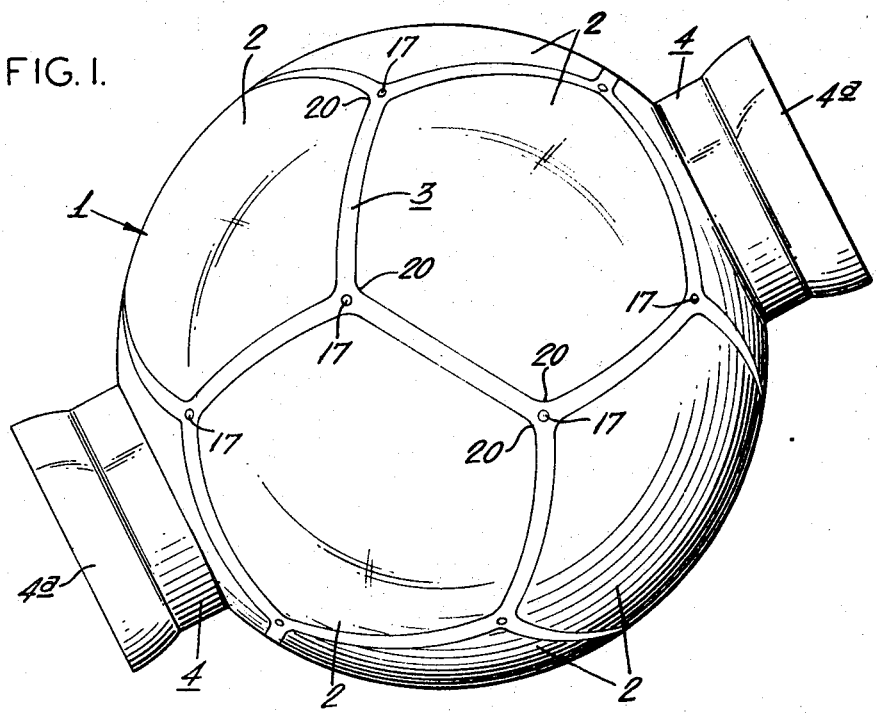
FIG. 1 is a diagrammatic elevation of a deep submergence module.

Refer first to FIG. 1. An enclosed chamber, capable of withstanding great compressive force and referred to in the above-identified patent as a deep submergence module, is denoted generally by numeral 1. The module 1 includes a plurality (10 in number, for example) of spherical segments 2 of pentagonal outer configuration. Spherical segments 2 are made of a devitrified (nucleated) glass material, preferably the so-called Pycoceram devitrified glass, commercially available from Corning Glass Works and disclosed in U.S. Pat. No. 2,920,971, dated Jan. 12, 1960.

For entrance and exit from the deep submergence module 1 one or more (in FIG. 1, two) of the total of 12 spherical segments making up the module may comprise a titanium alloy access segment 4, including a projecting edge portion 4a; the access segments 4 may generally have pentagonal outer configurations. As described in the above-mentioned '492 patent, connection may be made through access segments 4 to other underwater apparatus, or to other deep submergence modules.

Supporting each of the spherical segments 2, and also the access segments 4, at the boundaries thereof through extremely flat, coextensively adjoining surfaces, is a lattice framework 3 (shown diagrammatically in FIG. 1) made of a titanium-based alloy, including in the preferred embodiment 6 percent aluminum and 4 percent vanadium. The lattice-type framework 3 has a composite generally spherical configuration and provides 12 generally pentagonal open areas or cavities, 10 of which are closed in or covered respectively by individual glass segments 2 and the other two of which are closed in or covered respectively by the two individual titanium alloy access segments 4. The framework 3 is fabricated by welding together curved spokelike members or struts to form the lattice, and it is this welding of the framework struts with which the present invention is concerned. It may be noted that three strut members come together or intersect at each and every corner or vertex of the polygons (specifically, pentagons), throughout the spherical framework. Also, it may be noted that there are a total of 20 such intersections, for the entire sphere. According to this invention, the welded joints for the framework are located at the intersections of the struts, i.e., at the vertices of the polygons.

Figure 2:
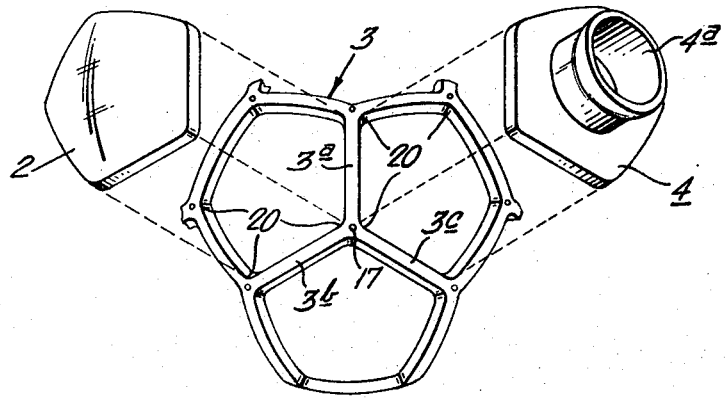
FIG. 2 is a fragmentary exploded view illustrating the primary components of the module of FIG. 1.

FIG. 2 is a fragmentary, exploded view somewhat diagrammatically illustrating the three principal components of the module of FIG. 1. FIG. 2 shows a generally spherical devitrified glass segment 2 having a pentagonal outer configuration, the framework 3, preferably composed of a 6 percent aluminum, 4 percent vanadium titanium-based alloy, and a titanium alloy access segment 4 with a projecting edge 4a.

Figure 3:
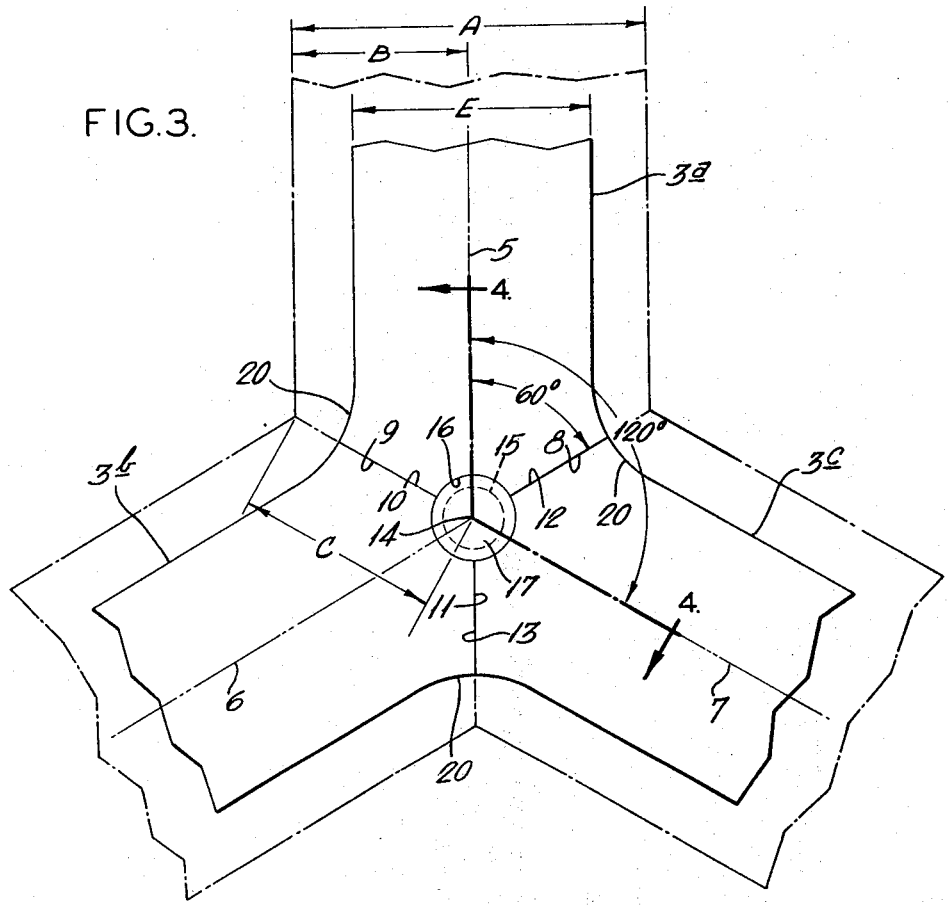
FIG. 3 is an elevation of a welded joint according to this invention.

FIG. 3 is an elevation of a typical corner or vertex of the framework 3. As such, it is an elevation of a welded joint according to this invention. In FIG. 3, the dot-dash boundary lines represent the outer edges of the framework members after "finish" machining, subsequent to welding. As previously stated, three spokelike members or struts intersect at each corner or vertex, and this invention is concerned with the method and structure of the welded joint encompassing these three members. The spokelike member 3a has the longitudinal centerline 6, and the spokelike member 3b has the longitudinal centerline 6, and the spokelike member 3c has the longitudinal centerline 7. The members 3a, 3b, and 3c are component members of the framework 3, are preferably made of the 6A1—4V Ti alloy previously mentioned, and have a transverse cross section which is generally trapezoidal. By way of example, the of or "rough" width A of each of the three members may be 3 inches, which means that the half-width B from the preparatory or nonfinish outer edge of each member to its centerline such as centerline 5 will be 1-½ inches.

Each of the members 3a, 3b, and 3c to be butt-welded is formed with a pair of intersecting planar beveled surfaces at its end to provide a "V" end configuration, each of these surfaces lying at an angle of 60° to the centerline of the respective member (as indicated for surface 8 of member 3a), and the two surfaces of each member intersecting on the centerline of the respective member. Thus, member 3a has the two beveled surfaces 8 and 9, member 3b has the two beveled surfaces 10 and 11, and member 3c has the two beveled surfaces 12 and 13. Typically, then, surfaces 8 and 9 both lie at 60° to the centerline 5 of member 3a, but on opposite sides thereof, and the same holds true for surfaces 10–13 on their respective members 3b and 3c.

Preparatory to butt-welding the members 3a, 3b, and 3c together at their ends, the three members are assembled into a wye configuration as illustrated in FIG. 3 (this figure actually showing an inverted wye), such that the centerlines 5, 6, and 7 all intersect at a common point 14 and form included angles of 120°, as indicated between center lines 5 and 7 in FIG. 3. When the members 3a–3c are so assembled, three pairs of mated surfaces are formed: (1). surface 8 of member 3a engages surface 12 of member 3c; (2). surface 9 of member 3a engages surface 10 of member 3b; (3). surface 11 of member 3b engages surface 13 of member 3c. It may be seen that the line of intersection of surfaces 11 and 13 forms an extension of centerline 5, the line of intersection of surfaces 8 and 12 forms an extension of centerline 6, and the line of intersection of surfaces 9 and 10 forms an extension of centerline 7.

With the dimensions A and B having the values previously given, the dimension C (distance along each of the paired mating surfaces such as 9, 10 to the common intersection point 14, measured in the plane of the paper in FIG. 3) is 1.732 inches, a value well within the capabilities of electron-beam welding equipment, even before a reduction in this length in a manner to be described. In this connection, it is pointed out that the electron-beam welding equipment would be passed in a direction perpendicular to the paper in FIG. 3 to butt-weld surfaces 9 and 10 in one pass, then another pass in the same sense to butt-weld surfaces 11 and 13, then a third pass in the same sense to butt-weld surfaces 8 and 12.

Prior to welding, but after the three spokelike members or struts 3a, 3b, and 3c have been assembled into a wye configuration, a hole 15 is drilled entirely through the joint in a direction perpendicular to the plane of the paper in FIG. 3, this hole being centered at point 14 and having a diameter of 0.5 inches, for example.

After the hole 15 is drilled, and before welding, a loosely fitting dummy titanium alloy pin (not shown) is inserted into hole 15. By way of example, this pin may have a diameter of 0.375 inch, where hole 15 is 0.5 inch in diameter.

After the members 3a, 3b, and 3c have been assembled into a wye configuration as described, and with the hole 15 drilled and the dummy pin in position therein, a first pass of the electron-beam welding equipment in a direction perpendicular to the paper is made, to butt-weld surfaces 9 and 10, followed by second and third passes in the same sense to butt-weld surfaces 11, 13, and 8, 12, respectively. The "depth" of each of the welds, assuming hole 15 has a diameter of 0.5 inch, would be 1.732−0.25=1.482 inches. During the welding, the combination of the hole 15 and the titanium pin therein effectively separates each pair of mated surfaces from each of the other two pairs, so that each pair of surfaces may be welded in a single respective pass, independently of the other pairs of surfaces.

After the welding passes have been completed, the dummy pin is removed from the hole 15 and discarded.

As a first step in the final finishing operation for the framework, the hole 15 is reamed and lapped to a larger diameter bore 16. The bore 16 is formed with a taper, the taper being, for example, 0.125 inch per foot of length and the taper being inwardly with the maximum diameter of the bore at the outer surface of the spherical-shaped framework 3. It is important that the bore 16 be radially disposed with respect to the spherical framework. Thus, if the outer radius of the finished framework is 6 feet, and the taper of bore 16 is 0.125 inch per foot, the diameter of bore 16 at the outer surface of the finished framework should be 0.75 inch.

Figure 4:
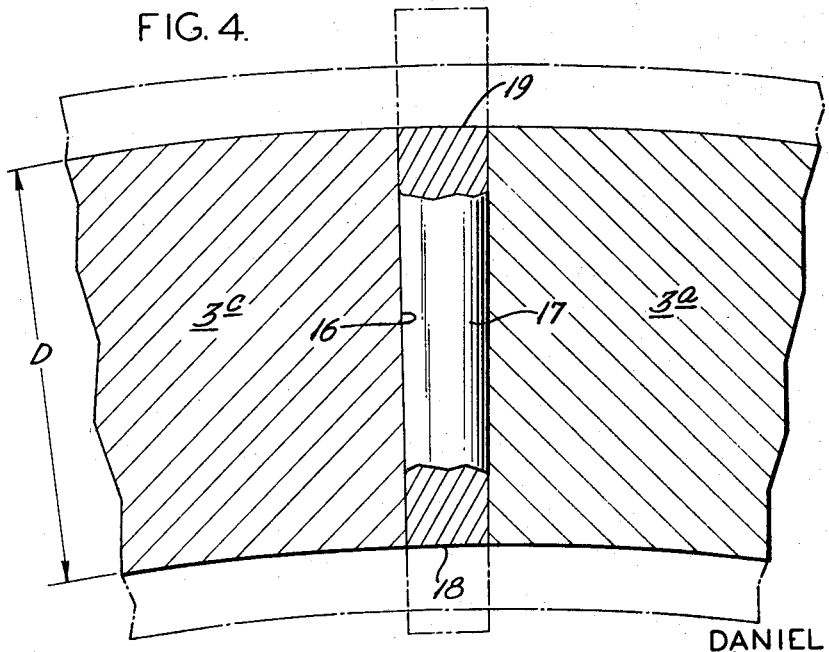
FIG. 4 is a section taken along line 4—4 in FIG. 3.

Refer now to FIG. 4, which is a section taken along line 4—4 in FIG. 3, the section line 4—4 following along centerline 7, common intersection point 14, and centerline 5. In FIG. 4, as in FIG. 3, the dot-dash boundary lines represent the outer edges of the framework members preparatory to or prior to welding, while the solid boundary lines represent the outer edges of the framework members after "finish" machining. By way of example, the "finish" height D of these members (measured more or less vertically in FIG. 4) may be 3.52 inches, while the "finish" width E in FIG. 3 may be 2 inches.

After the bore 16 has been reamed and lapped to a taper as previously described, a titanium alloy pin 17 of matching taper is lapped and driven into the bore 16, into intimate engagement with the (tapered) wall of the bore. The dot-dash lines at the upper and lower ends of pin 17 in FIG. 4 represent the ends of the same prior to the "finish" machining.

After the pin 17 has been placed in position, the four exposed sides of the spokelike members 3a, 3b, 3c, etc. of the framework are machined to bring them down to the solid line outlines in FIGS. 3 and 4. During this machining, and as a part thereof, the ends of the pin 17 are machined off flush with the inner and outer faces of the framework members, as indicated at 18 and 19, respectively.

As previously mentioned, the framework 3 is intended to form the supporting means for a spherical deep submergence module which, in use, is subject to great external compressive force. The pin 17 is tapered down to the center of the sphere, so that it is radially disposed with respect to the spherical chamber. As a result, stress concentrations at the center of the welded joint in the framework are eliminated, and the stress distribution is enhanced throughout the abutting areas of the mating surfaces 8, 12 and 11, 13 and 9, 10.

The mating surfaces of the divitrified glass segments 2 and the framework 3 are almost perfectly flat and are substantially radially disposed with respect to the spherical chamber. This prevents stress concentrations at these interfaces. The machining previously referred to includes the forming of a radius 20 (radius 1 inch, for example) at each of the corners of the framework 3. Actually, a conical surface, whose center is at the center of the sphere, is formed at each of these locations (corners). These conical surfaces 20 are formed with the same precision as the flat, radially disposed framework surfaces just mentioned, and are formed tangent to these latter surfaces with the same degree of precision. The conical shape of the corner surfaces 20 also prevents stress concentrations at these locations. Obviously, the glass segments 2 would also be provided with matching conical surfaces at the corners.

The foregoing specification has described in detail the fabrication and structure of a single one of the welded joints at the corners of the framework 3. Each of the remaining 19 joints in the spherical framework 3 (see FIG. 1) is fabricated in exactly the same manner.

In the above description, it was stated that the hatch or access segments 4 are inserted into the framework 3 in the same manner as are the glass segments 2. However, it is quite possible to weld the hatch segment or segments into the framework 3 prior to the finish machining of the latter, and then finish machine such hatch segments along with the framework. In this way, finish machining of the five side surfaces of the framework at each hatch location can be eliminated.

The invention claimed is:

1. The method of joining together three spokelike metallic members into a wye configuration, which comprises forming a pair of intersecting planar beveled surfaces on one end of each member, assembling said members into a wye configuration with the two surfaces on each member engaging individually a surface on each respective one of the other two members, thereby forming three pairs of mated surfaces, welding together each pair of mated surfaces, forming a bore centered on the common point of intersection of all of said surfaces, and inserting a rigid metallic element into said bore in close engagement with the wall thereof.

2. Method of claim 1, wherein said element and said members are made from the same metal.

3. Method of claim 1, wherein said bore is tapered in size from one end to the other thereof, and wherein said element has a matching taper.

4. Method according to claim 1, wherein the planes of the two surfaces formed on each member lie at angles of 60° to the longitudinal axis of the corresponding member.

5. Method of claim 1, wherein said element and said members are made from the same metal, wherein said bore is tapered in size from one end to the other thereof, and wherein said element has a matching taper.

6. Method set forth in claim 1, including also the steps, prior to welding, of forming an opening centered on the common point of intersection of all of said surfaces and extending entirely through said members in the thickness direction, and inserting a metallic pin loosely into said opening.

7. Method of claim 1, wherein said element and said members are both made from a titanium alloy.

8. In a lattice-type framework, three spokelike metallic members adapted to be joined together at their ends to form a wye configuration, each of said members having at one end a pair of intersecting planar beveled surfaces which mate with those of the remaining two members to form three pairs of mated surfaces which are welded together; means forming a bore centered on the common point of intersection of all of said surfaces, and a rigid metallic element in said bore and in close engagement with the wall thereof.

9. Structure of claim 8, wherein said element and said members are made from the same metal.

10. Structure of claim 8, wherein said element and said members are both constructed from a titanium alloy.

11. Structure of claim 8, wherein said bore is tapered in size from one end to the other thereof, and wherein said element has a matching taper.

12. Structure according to claim 8, wherein the planes of the two surfaces on each member lie at angles of 60° to the longitudinal axis of the corresponding member.

13. Structure of claim 8, wherein said members are made from the same metal, wherein said bore is tapered in size from one end to the other thereof, and wherein said element has a matching taper.

* * * * *

UNITED STATES PATENT OFFICE
CERTIFICATE OF CORRECTION

Patent No. 3,632,148          Dated January 4, 1972

Inventor(s) Daniel C. Garber

It is certified that error appears in the above-identified patent and that said Letters Patent are hereby corrected as shown below:

On the cover sheet in the ABSTRACT, last line, after "titanium" insert -- ) -- . Column 1, line 4, "vary" should read -- very -- ; line 7, "tube" should read -- type -- ; line 18, "from" should read -- form -- . Column 2, line 34, "Pycoceram" should read -- Pyroceram -- . Column 3, after line 4, insert -- preparatory to or prior to welding, while the solid boundary lines represent the outer edges of the framework members -- ; line 10, "6, and" should be -- 5, -- ; line 16, "of" should read -- preparatory -- . Column 4, line 58, "divitrified" should read -- devitrified -- .

Signed and sealed this 14th day of November 1972.

(SEAL)
Attest:

EDWARD M. FLETCHER, JR.          ROBERT GOTTSCHALK
Attesting Officer                  Commissioner of Patents